United States Patent [19]

Ohta et al.

[11] Patent Number: 4,905,101
[45] Date of Patent: Feb. 27, 1990

[54] TIME BASE CORRECTOR

[75] Inventors: Haruo Ohta, Yawata; Tokikazu Matsumoto, Osaka, both of Japan

[73] Assignee: Matsushita Electric Industrial Co., Ltd., Osaka, Japan

[21] Appl. No.: 216,416

[22] Filed: Jul. 7, 1988

[30] Foreign Application Priority Data

Jul. 21, 1987 [JP] Japan .............................. 62-181530

[51] Int. Cl.$^4$ ............................................. H04N 5/78
[52] U.S. Cl. .................................... 360/36.2; 341/110
[58] Field of Search ............... 341/110, 118; 360/36.1, 360/362

[56] References Cited

U.S. PATENT DOCUMENTS

| 3,931,638 | 1/1976 | Lentz et al. | 360/36 |
| 4,120,000 | 10/1978 | Ninomiya | 360/36 |
| 4,675,724 | 6/1987 | Wagner | 360/36.2 |
| 4,677,499 | 6/1987 | Shirota et al. | 360/36.2 |
| 4,733,312 | 3/1988 | Morimoto | 360/36.2 |

OTHER PUBLICATIONS

Sadashige, "Overview of Time-Base Correction Techniques and Their Application", SMPTE Journal, vol. 85, Oct. 1976, pp. 787-791.

Primary Examiner—William M. Shoop, Jr.
Assistant Examiner—Marc S. Hoff
Attorney, Agent, or Firm—Wenderoth, Lind & Ponack

[57] ABSTRACT

A disclosed time base corrector comprises a clock generator for generating a clock signal whose period is fixed, an analog-to-digital converter for sampling amplitude values of an input analog signal having a time base error at sampling points given by the clock signal, an adaptive interpolation filter for interpolating a correct amplitude value at a resampling indicated by a resampling position signal, a resampling position signal producing circuit for detecting the time base error and producing from the detected error the resampling position signal, and a digital-to-analog converter for converting the interpolated amplitude values to an analog signal which has no time base errors. The time base correction is implemented by pure digital signal processing without any analog signal processing. The time base corrector does not use such a clock signal that has time base fluctuations.

8 Claims, 7 Drawing Sheets

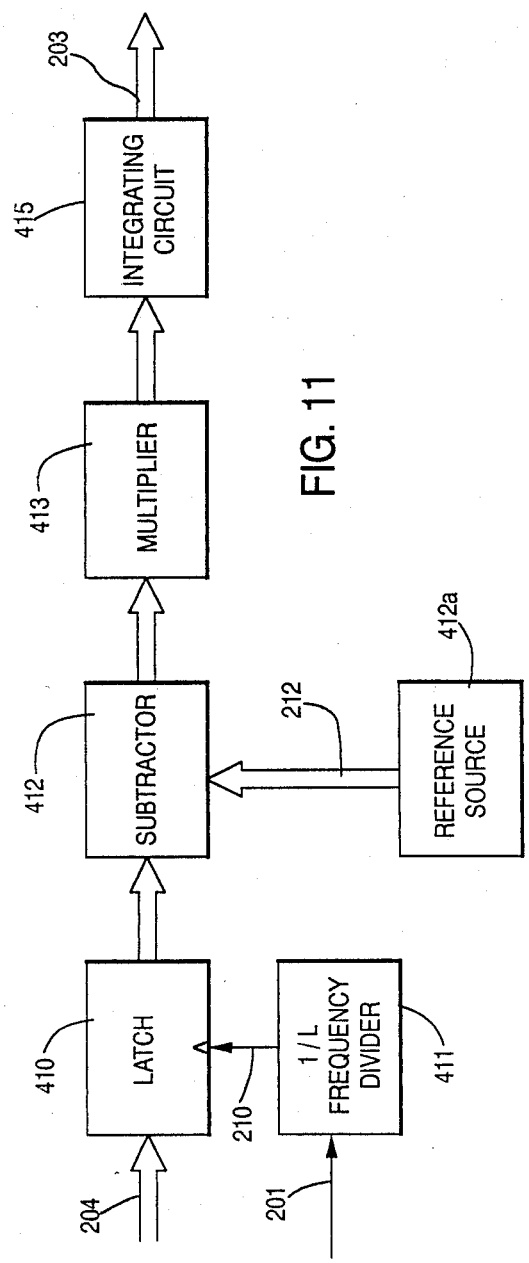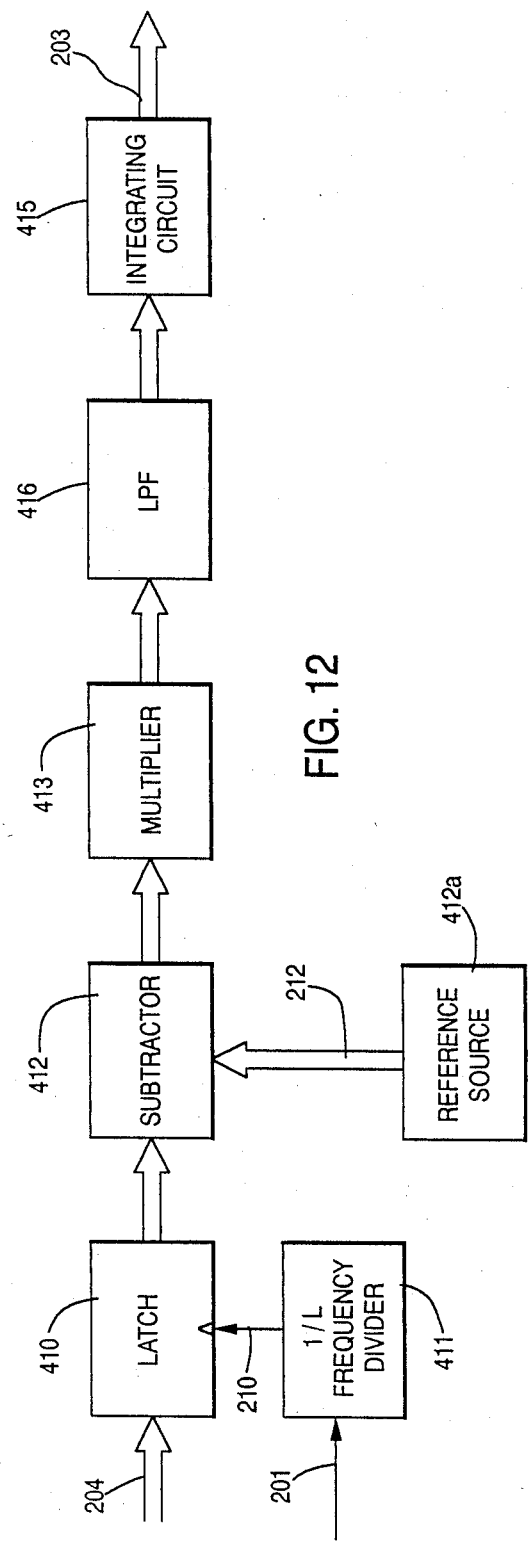

TIME BASE CORRECTOR

BACKGROUND OF THE INVENTION

1. Field of the Invention

The present invention relates to a time base corrector for correcting a time base error, or a time base instability, of a signal such as a video signal reproduced from a magnetic tape.

2. Description of the Prior Art

In video tape recorders used for broadcast, time base correctors have been widely used for correcting time base errors of reproduced video signals.

U.S. Pat. No. 3,931,638 discloses a time base corrector employing analog shift registers in which one register has samples of one video line signal clocked into at a rate corresponding to its time base instability, and the other register clocks out, at a uniform rate, analog signals of the previous line, and vice versa. Another type time base corrector employing variable delay lines is disclosed in an article "Overview of Time-Base Correction Techniques and Their Applications" by K. Sadashige, SMPTE Journal Vol. 85 October 1976, pp. 787-791. These time base correctors have generally known disadvantages due to the use of analog devices such as analog shift registers and variable delay lines.

The above Sadashige's article disclose also, in pages 789-790, a time base corrector employing a digital memory. A similar digital time base corrector is disclosed in U.S. Pat. No. 4,120,000. These conventional digital time base correctors are basically configured as follows.

A reproduced analog video signal with a time base error is sampled and converted into a digital signal by an analog-to-digital (AD) converter responsive to a clock signal which is locked to the incomming reproduced analog video signal. The digital signal is stored into a memory. The temporarily stored digital signal is read out in response to another clock signal that has a fixed time base. The read-out digital signal is converted to an analog signal by a digital-to-analog (DA) converter. The analog video signal outputted from the DA converter has no time base errors.

Such conventional digital time base corrector, however, have some problems. One problem is that it must be provided with analog components in the clock generator for generating the clock signal which is locked to the incomming reproduced analog video signal. Performance variations and temperature characteristics of the analog components will cause undesired variations of the generated clock signal, which badly affect the performances of the time base corrector. In addition, since the analog components including capacitors and inductors cannot be mounted in an integrated circuit, it is difficult to reduce the cost of the time base corrector.

Another problem is that, since the memory writing and reading operations are controlled by the respective two different clock signals, constructions of the memories and memory controller are complicated.

Furthermore, since the AD converter is driven by the time base fluctuated clock signal, the output of the AD converter cannot be used commonly in other digital processing systems.

SUMMARY OF THE INVENTION

An object of the present invention is to provide a novel time base corrector which is accurate and stable in operation.

Another object of the present invention is to provide a novel time base corrector which can be easily integrated in an integrated circuit to be low in cost.

Still another object of the present invention is to provide a novel time base corrector which does not use such a clock signal that has time base fluctuation, but uses only a clock signal whose period is fixed.

To achieve these objects, a time base corrector of the present invention comprises:

a clock generator which generates a clock signal having a fixed period;

an analog-to-digital converter driven by the clock signal for sampling amplitude values of an input analog signal at sampling points determined by the clock signal;

a resampling position signal producing circuit for detecting a time base error of the input analog signal and producing from the detected time base error a resampling position signal indicative of a resampling point at which an amplitude value of the input analog signal which would be sampled at the sampling point if there were not the time base error is present;

an adaptive interpolation filter for interpolating amplitude values at resampling points indicated by the resampling position signal using the sampled amplitude values and the resampling position signal, and outputting the interpolated amplitude values at the sampling timings given by the clock signal; and a digital-to-analog converter driven by the clock signal for converting the output interpolated amplitude values to an analog signal, the analog signal being a time base error corrected signal.

The resampling position signal producing circuit may detect the time base error from either the output of the analog-to-digital converter or the output of the adaptive interpolation filter.

These and other objects, features and advantages of the present invention will be more fully apparent from the following description taken with reference to the accompanying drawings which are given by way of illustration only and are not limitative of the invention, wherein:

BRIEF DESCRIPTION OF THE DRAWINGS

FIG. 11 is a block diagram of an example of resampling position signal producing circuit in the second embodiment; and FIG. 12 is a block diagram of another example of resampling position signal producing circuit in the second embodiment.

DESCRIPTION OF THE PREFERRED EMBODIMENTS

Figure 1:
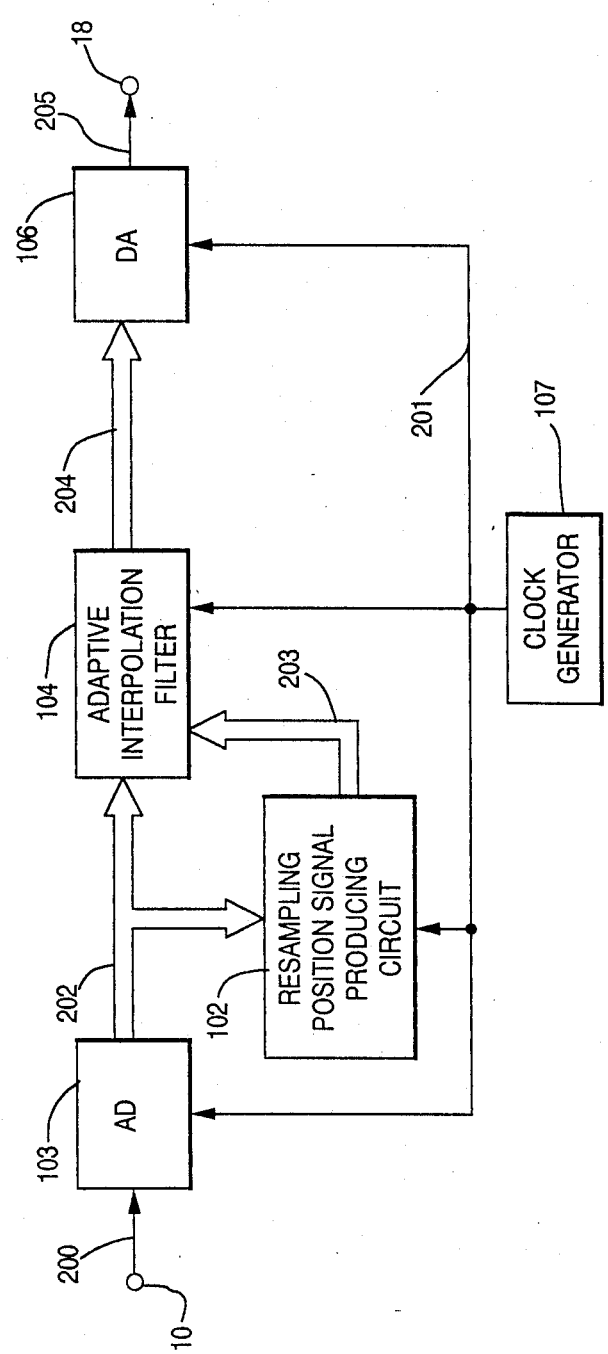
FIG. 1 is a block diagram of a first embodiment of the present invention.

FIG. 1 is a block diagram of the first preferred embodiment of the invention for correcting time base errors of a video signal 200 reproduced from a recording medium (not shown). A clock generator 107 comprising a crystal oscillator generates a clock signal 201 having a constant period T. The clock period T is equal to 1/L of a desired horizontal scanning period of the video signal. The analog video signal 200 inputted through an input terminal 10 is limited in frequency band within a half of the clock frequency $f_s$ (=1/T). An analog-to-digital (AD) converter 103 samples amplitude values of the video signal 200 in response to the clock signal 201 to produce a digital video signal 202. A resampling position signal producing (RPSP) circuit 102 detects the time base error of the digitized video signal 202 from a luminance synchronizing signal of the digitized video signal 202, and produces a resampling position signal 203 which represents a position of a resampling point relative to a sampling point of the AD converter, at which resampling point an amplitude value which would be sampled at the sampling point if there were no time base error is present. An adaptive interpolation filter 104 generates a digital signal 204 which represents amplitude values of the video signal 200 at respective resampling points indicated by the resampling position signal 203, by means of interpolation arithmetic using the digital signal 202 and the resampling position signal 203. A digital-to-analog (DA) converter 106 converts the digital signal 204 to an analog video signal 205, which is outputted from an output terminal 18. The output video signal 205 has no time base errors and its horizontal scanning period is L times the period of the clock signal 201.

Figure 2:
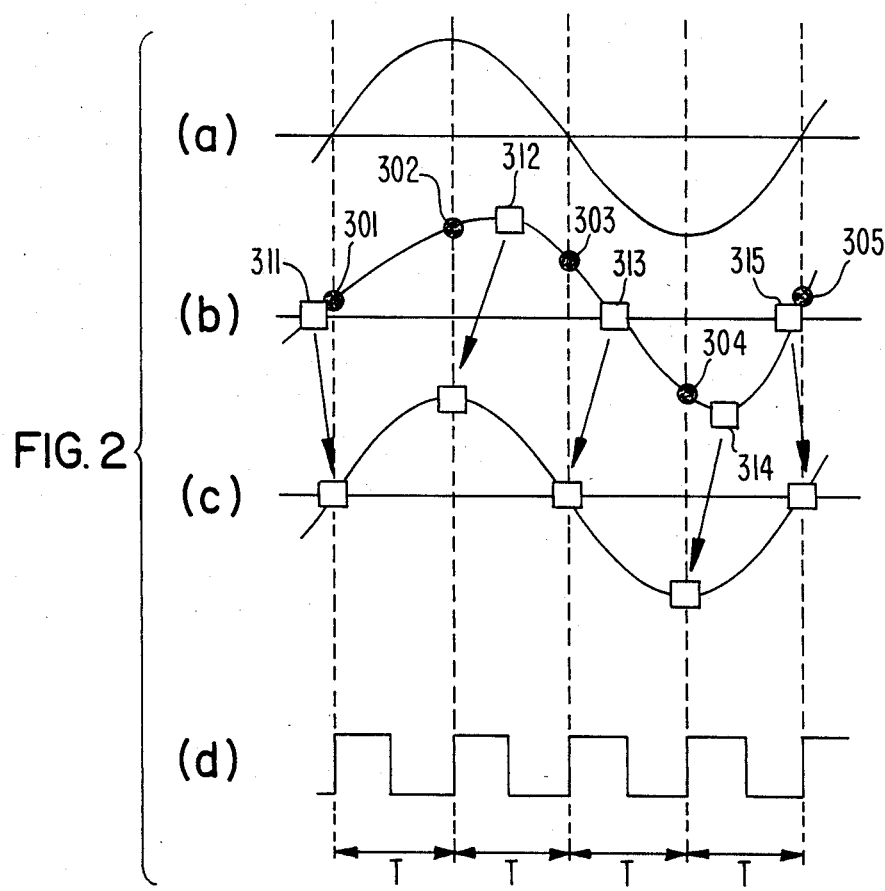
FIG. 2 is a waveform chart for illustrating the principle of the present invention.

FIG. 2 illustrates the principle of the time base error correction in this embodiment. In FIG. 2, (a) is a waveform of an original signal (before recording) without time base errors, (d) shows the clock signal 201 whose period is T. FIG. 2 (b) is a waveform of the reproduced signal 200 with a time base error. The AD converter 103 in FIG. 1 samples amplitude values of the input signal 200 at sampling points 301–305 indicated by black dots in FIG. 2 (b). The adaptive interpolation filter 104 in FIG. 1 calculates amplitude values at resampling points 311–315 indicated by a square symbol in FIG. 2 (b) which are locked to the time base of the input signal 200, and outputs the resampled data at timings given by the clock signal 201 as shown in FIG. 2 (c). The signal shown in FIG. 2 (c) is the time base error corrected signal, which is identical to the original signal shown in FIG. 2 (a).

Figure 3:
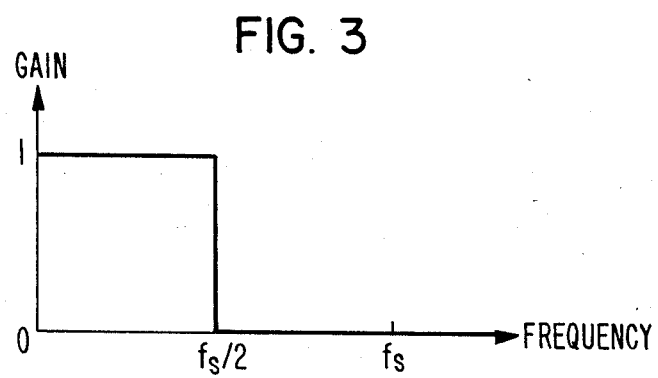
FIG. 3 is a chart showing a frequency characteristic of the interpolation function according to the present invention.

The principle of the interpolation in the adaptive interpolation filter 104 in FIG. 1 will be described. If the input signal 200 in FIG. 1 is expressed as v(t), the sampled digital signal 202 can be represented as v(kt), where k is an integer. Since the input signal v(t) is bandlimited within a half of the clock frequency $f_s=1/T$, an amplitude value $v(\tau)$ at a time $\tau$ is obtained using the sampled data by the following equation (1):

$$V(\tau) = \sum_{k=-\infty}^{\infty} v(kT) \cdot s(\tau - kT) \quad (1)$$

where s(t) is an interpolation function. The interpolation function s(t) is an impulse response of a filter whose frequency response S(f) satisfies the following equation (2):

$$S(f) = \begin{cases} 1 & (|f| < f_m) \\ 0 & (|f| > f_s - f_m) \end{cases} \quad (2)$$

where $f_m$ is the maximum frequency of the input video signal v(t), $f_s$ (=1/T) is the sampling frequency. For example if S(f) is a frequency response of an ideal low-pass filter as shown in FIG. 3, s(t) is obtained by the following equation (3):

$$s(t) = \frac{\sin\{(\pi/T) \cdot t\}}{(\pi/T) \cdot t} \quad (3)$$

According to Eq. (1), infinite number of sampled values v(kT) (k = −∞ ~ +∞) are needed for producing v(τ). However, if the error in computation is small enough (for example, less than ½ of the LSB of the digital data), there is no problem for practical use. So the present invention uses the following equation (4):

$$v(\tau) = \sum_{k=M}^{N} v(kT) \cdot s(\tau - kT) \quad (4)$$

Where N and M are integers which are determined so that the error in computation according to Eq. (4) is small enough.

In FIG. 1, the resampling point signal 203 represents the resampling time τ that is locked to the time base of the input video signal 200. The adaptive interpolation filter 104 generates v(τ) according to Eq. (4).

Figure 4:
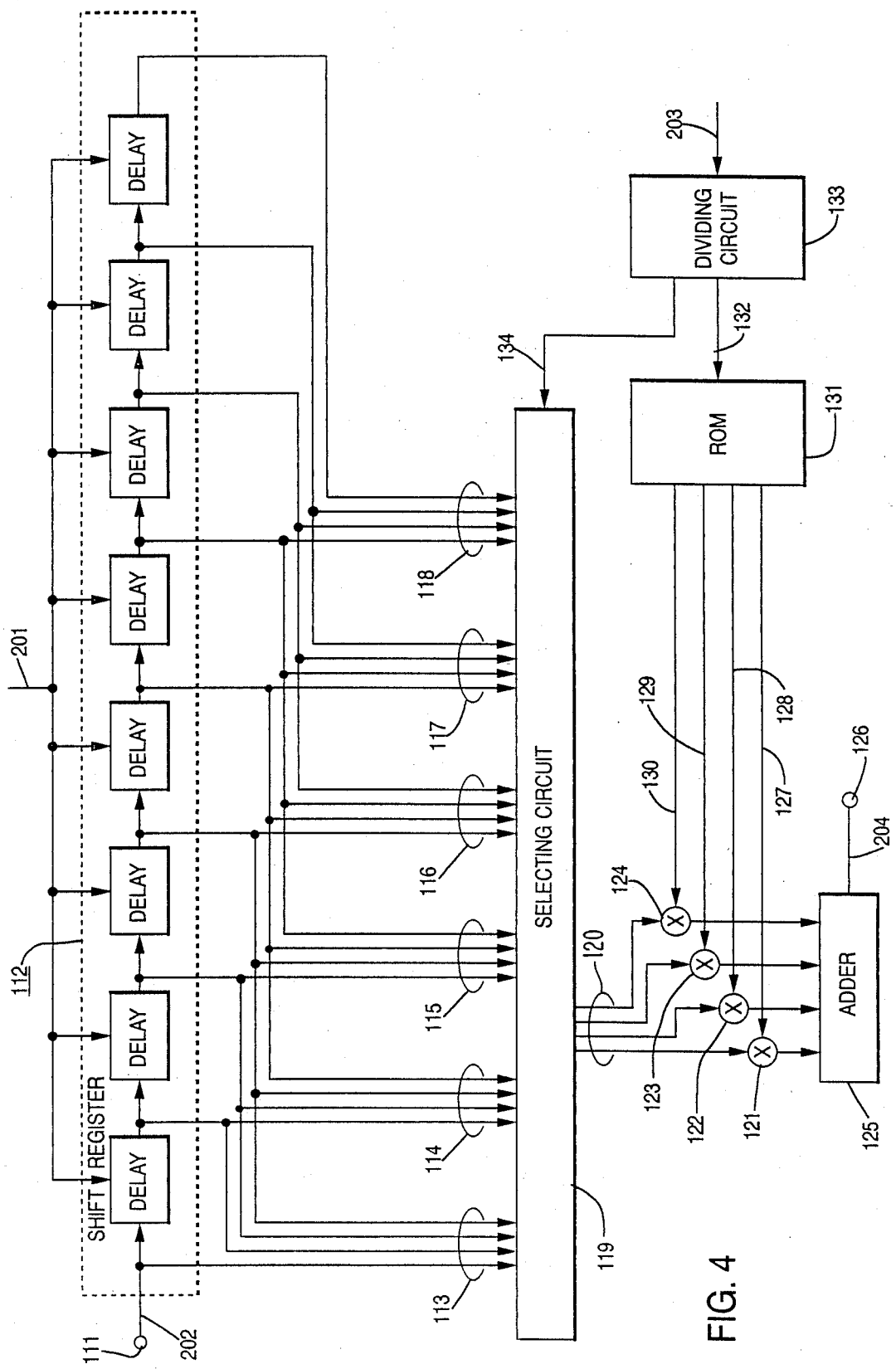
FIG. 4 is a block diagram of an example of adaptive interpolation filter used in the present invention.

Next, an example of the adaptive interpolation filter 104 will be described with reference to FIG. 4. FIG. 4 is a block diagram of the adaptive interpolation filter 104 which produces an interpolated amplitude value using four sampled values (in other words, N and M in Eq. (4) satisfy N-M+1=4). In FIG. 4 lines except for the lines of the clock signal 201 represent digital signal lines each having a plurality of parallel bits. The received digital signal 202 at an input terminal 111 of the adaptive interpolation filter is fed to a shift register 112 comprising a plurality of serially connected delay circuits each being configured by a plurality of parallel D-flip-flops. In the shift register 112, each delay circuit delays a data inputted thereto for a time corresponding to one period of the clock signal 201. From the parallel output of the shift register 112, sequentially shifted sets of four successive sampled values 113 to 118 each being shifted by one clock from the previous set are fed to selecting circuit 119. The selecting circuit 119 selects one of the sets 113 to 118 according to a selecting signal 134 (which will be described later) and outputs the selected set as a data set 120.

On the other hand, the resampling position signal 203 is received by a dividing circuit 133. The dividing circuit 133 produces the selecting signal 134 and a time indicating signal 132. The selecting signal 134 and the time indicating signal 132 will be described below with reference to FIG. 5.

Figure 5:
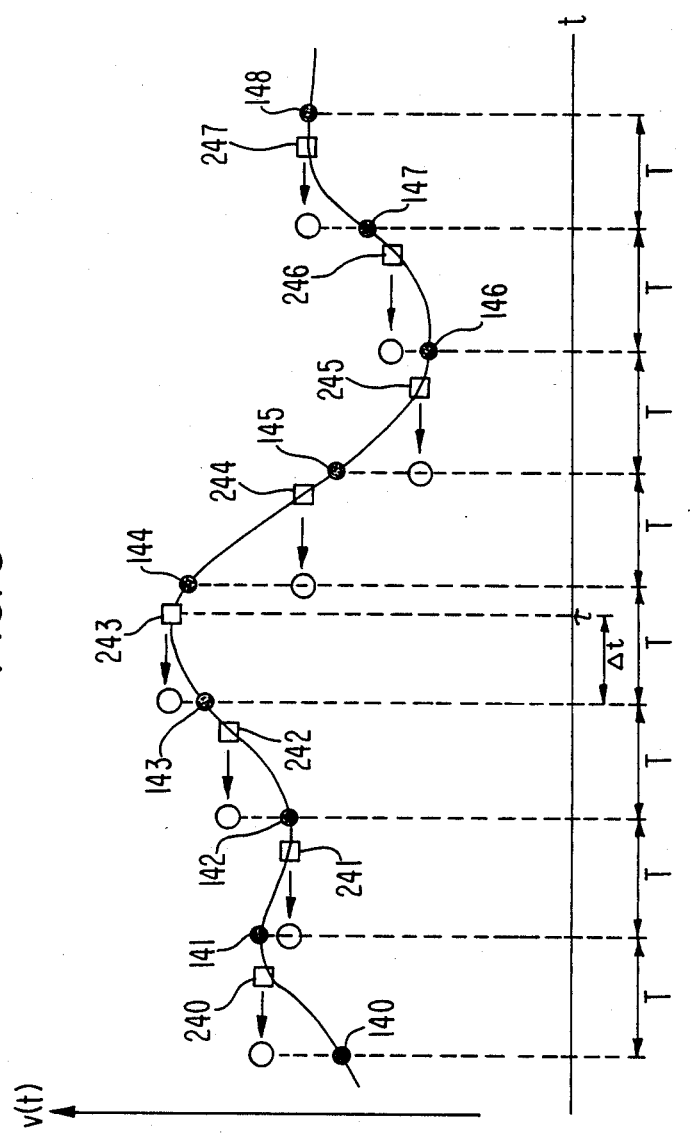
FIG. 5 is a waveform chart for illustrating the operation of the adaptive interpolation filter shown in FIG. 4.

FIG. 5 shows a waveform of a part of the input video signal 202. Points 140 to 148 indicated by black dots are sampling points sampled by the AD converter 103 in FIG. 1 in response to the clock signal 201. Points 240 to 247 indicated by square symbols are resampling points which would be sampled if there were no time base error and which are to be interpolated by the adaptive interpolation filter 104 in FIG. 1. The interpolated, or resampled, data are outputted at the timing synchronized with the clock signal 201 as indicated by white circles in FIG. 5. Considering as an example the resampling point 243 which is positioned between the sampling points 143 and 144 and shifted by $\Delta t$ from the sampling point 143, the data set of four successive sampled values at the sampling points 142 to 145 is selected as the data set 120 in FIG. 4 by the selecting circuit 119 according to the selecting signal 134. The time indicating signal 132 in FIG. 4 represents the time shift $\Delta t$ within one period of the clock signal 201 as shown in FIG. 5. Predetermined upper bits of the resampling position signal 203 are used as the selecting signal 134, and the remaining lower bits are used as the time indicating signal 132. Generally, the time base error can be expressed as $nT + \Delta t$, when n is an integer (either positive or negative) including 0, T is the period of the clock signal 201, and $\Delta t$ is a time shift within one period of the clock signal 201. The upper bits of the resampling position signal represent $nT$ and the lower bits represent $\Delta t$.

Referring again to FIG. 4, the four sampled values of the data set 120 are fed to multipliers 121 to 124 respectively. On the other hand, the time indicating signal 132 is fed as an address to a read-only-memory (ROM) 131 so that coefficient data 127 to 130 are read from the ROM 131, and led to the multipliers 121 to 124 respectively. The coefficient data 127 to 130 represent $s(\tau-MT)$, $s(\tau-(M+1)T)$, $s(\tau-(M+2)T)$, and $s(\tau-(M+3)T)$ ($=s(\tau-NT)$ in Eq. (4) respectively. The multipliers 121–124 multiply the four sampled values of the data set 120 by the coefficient data 127-130, respectively. An adder 125 adds the outputs of the multipliers 121 to 124 to obtain the signal 204 which represents $v(\tau)$ in Eq. (4) and which is the time base error corrected signal. The signal 204 is outputted from an output terminal 126.

The above description of the adaptive interpolation filter 104 was done in the condition of $N-M+1=4$ for simplifying the explanation. Actually, N and M should be determined so that the error in computation according to Eq (4) is small enough. The number of stages of the shift register 112 should be determined according to the range of time base correction to be needed.

Figure 6:
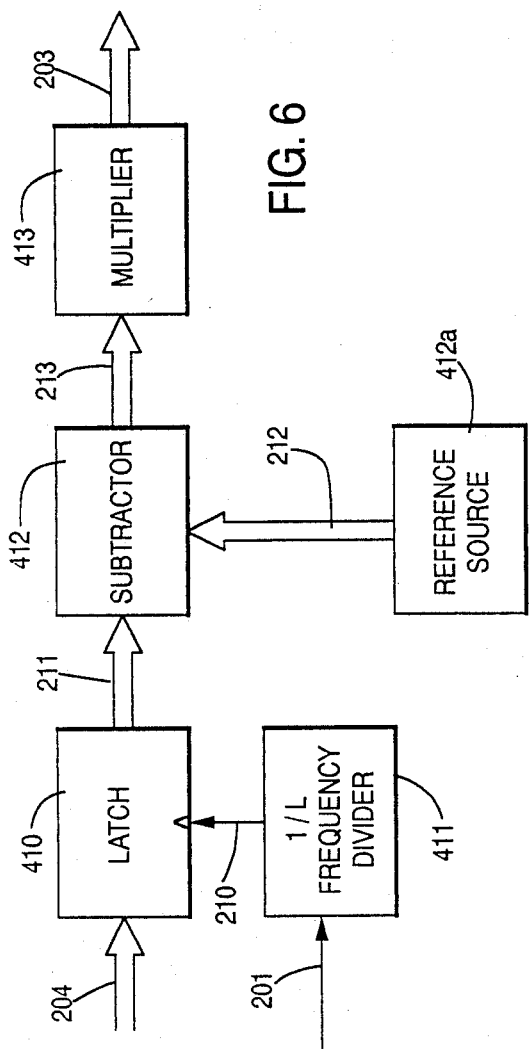
FIG. 6 is a block diagram of an example of resampling position signal producing circuit in the first embodiment of the invention.
Figure 7:
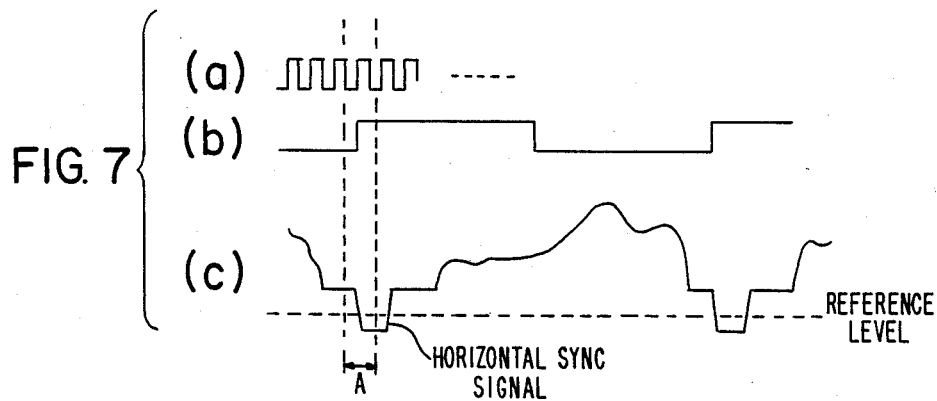
FIG. 7 and FIG. 8 are waveform charts for illustrating the operation of the resampling position signal producing circuit shown in FIG. 6.
Figure 8:
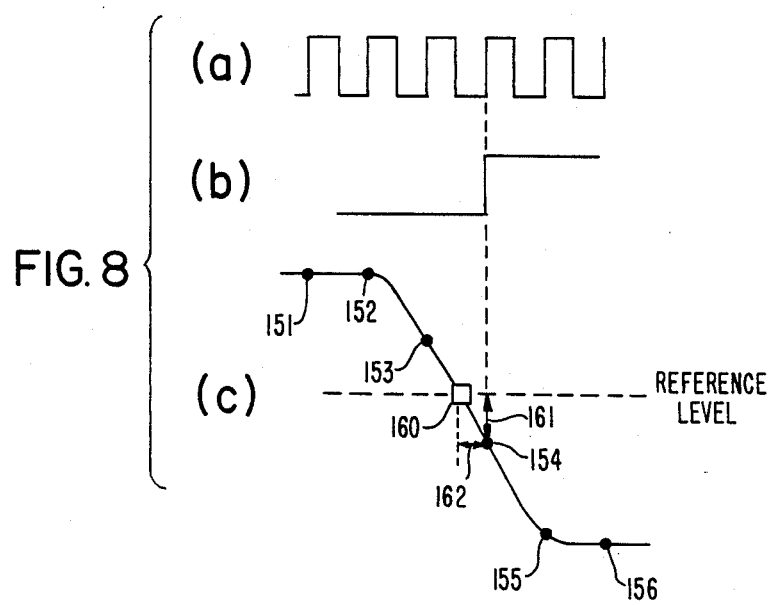

Next, it will be described below how to get the resampling position signal 203 with reference to FIG. 6, FIG. 7 and FIG. 8. FIG. 6 is a block diagram of an example of the resampling position signal producing circuit 102, FIG. 7 shows waveforms at some points in the resampling position signal producing circuit in FIG. 6, and FIG. 8 is an enlarged detail during the period A in FIG. 7.

In FIG. 6, a frequency divider 411 divides the frequency of the clock signal 201 by L to produce a divided clock signal 210 whose frequency is 1/L times the frequency of the clock signal 201. So, the period of the divided clock signal 210 is equal to the desired horizontal scanning period. The relationship among the clock signal 201, the divided clock signal 210 and the input video signal 200 is illustrated in FIG. 7. In FIG. 7, (a) shows the clock signal 201, (b) shows the divided clock signal 210, and (c) shows the input video signal 200 with a reference level represented by a reference signal 212 in FIG. 6. The leading edge of each pulse of the divided clock signal 210 occurs during the transition period of each horizontal synchronizing signal of the input video signal.

In FIG. 6, a latch circuit 410 latches the digitized video signal 202 in response to the divided lock signal 210 to obtain a latched signal 211. Referring to FIG. 8, the amplitude value at a sampling point 154 is latched among values at sampling points 151 to 156. A subtractor 412 in FIG. 6 produces an amplitude difference, as a signal 213, between the latched signal 211 and the reference signal 212 which is produced by a reference source 412a. Referring to FIG. 8, the reference level indicates that a point 160 is a desired sampling point which should be sampled by the divided clock signal 210 shown in FIG. 8 (b). The signal 213 in FIG. 6 represents an amplitude difference shown as 161 in FIG. 8 (c). Referring to FIG. 8 (c), a time difference 162 between the latched point 154 and the desired point 160 is almost in proportion to the amplitude difference 161. Therefore, the signal 213 in FIG. 6 can be regarded as a signal representing the time difference 162. The signal 213 is multiplied by a predetermined coefficient at a multiplier 413 to become the resampling position signal 214.

As described above, the embodiment in FIG. 1 can correct time base errors by implementing digital signal processing without any analog signal processing. Therefore it is not affected by variations of physical quantities of and the temperature characteristics of analog components. Furthermore, since the embodiment does not use any analog components, it is able to fabricate the whole circuit in an integrated circuit thereby to reduce cost. Still more, since the embodiment does not use any clock signal having time base fluctuations, it is easy to join the time base corrector with other digital signal processing systems. One more feature of the present embodiment is that the time base errors are corrected by means of feedforward control, which can correct rapid time base fluctuations.

Figure 9:
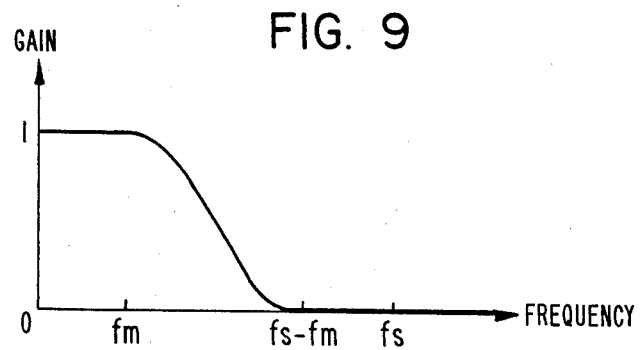
FIG. 9 is a chart showing another frequency characteristic of the interpolation function according to the present invention.

Incidentally, in the above description, the interpolation function s(t) is obtained based on Eq. (3) which is the impulse response of an ideal low-pass filter. But, it may be possible to use as s(t) an impulse response of a cosine role-off filter whose frequency response is shown in FIG. 9. In such case, the function s(t) is obtained by the following equation (5):

$$S(t) = \frac{T}{\pi \cdot t} \cdot \sin\{(\pi/T) \cdot t\} \cdot \cos\{\pi(2f_m - 1/T) \cdot t\} \times \qquad (5)$$

$$1/\{1 - 4(2f_m - 1/t)^2 \cdot t^2\}$$

Using this s(t), the number of the sampled values for producing v(t) interpolated with an adequately small error (namely, N-M+1 in Eq. (4)) can be drastically decreased. Therefore the adaptive interpolation filter can be constructed in an smaller circuit scale.

Although the above example of the adaptive interpolation filter employs the shift register for delaying the input signal and the selecting circuit for selecting the data set, the present invention is not limited to them. For example, the adaptive interpolation filter may use random-access-memories (RAMs) for delaying the input signal and an address control circuit for selecting the data set.

Next, referring to FIG. 10, a second preferred embodiment of the present invention will be described.

Figure 10:
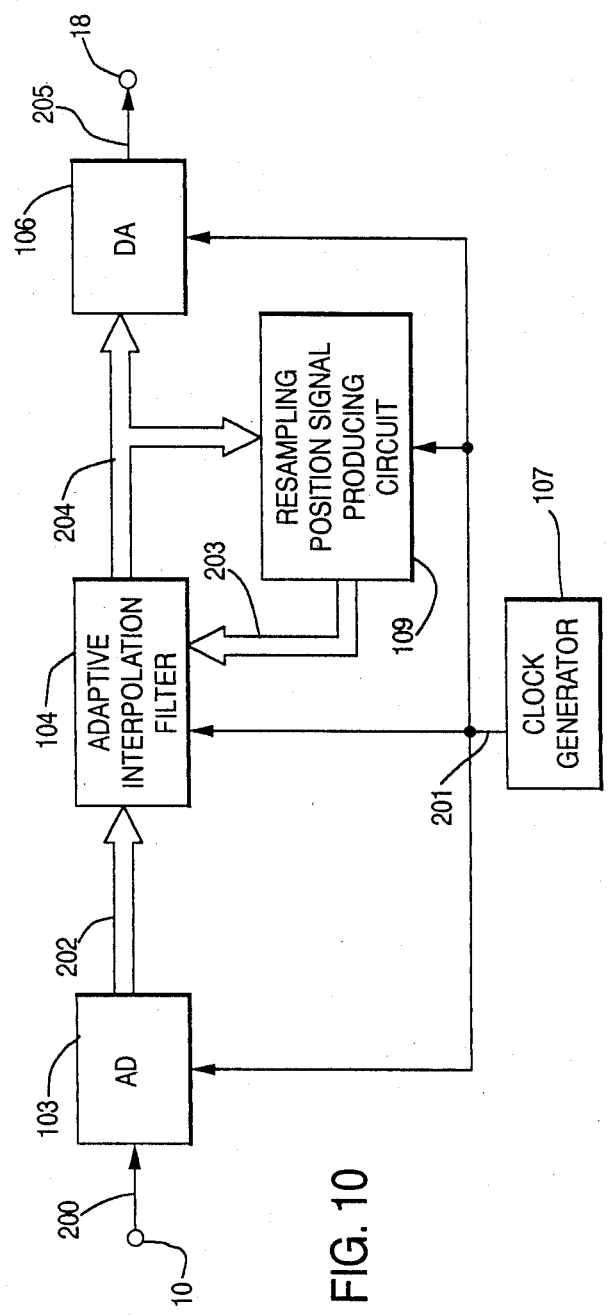
FIG. 10 is a block diagram of a second embodiment of the present invention.

FIG. 10 is a block diagram of the second preferred embodiment of the invention. In FIG. 10, the same numbers are assigned to the blocks having the same functions as those of the first embodiment in FIG. 1. In this embodiment, a resampling position signal producing (RPSP) circuit 109 detects the time base error of the digital signal 204 from the luminance synchronizing signal of the digital signal 204 and feeds the resampling position signal 203 back to the adaptive interpolation filter 104.

Examples of the resampling position signal producing circuit 109 will be described below with reference to FIGS. 11 and 12.

FIG. 11 is a block diagram of a first example of the resampling position producing circuit 109. In FIG. 11, the same numbers re assigned to the blocks having the same functions as those of the circuit in FIG. 6. The input signal of the resampling position signal detecting circuit is the signal 204 which has been subjected to time base error correction. So, the resampling position signal 203 to be fed back to the adaptive interpolation filter 104 is generated by integrating the output signal of the multiplier 413 at an integrating circuit 415 for keeping the previous resampling position and adding thereto a present time base error.

In the embodiment shown in FIG. 10, the time base error is corrected by a feedback control. Therefore, it is hardly affected by noises. And needless to say, this embodiment has the same features as those of the first embodiment in FIG. 1 except for the feedforward control.

A second example of the resampling position signal producing circuit 109 for the second embodiment of the invention shown in FIG. 10 will be described below with reference to FIG. 12.

FIG. 12 is a block diagram of the second example of the resampling position signal producing circuit 109. In FIG. 12, the same numbers are assigned to the blocks having the same functions as those of the circuit in FIG. 11. In this circuit, a low-pass filter 416 is inserted between the constant multiplier 413 and the integrating circuit 415 for eliminating noises usually having high frequencies. Since the low-pass filter is inserted in the feedback loop, influence of noises are further reduced, so that the performance for correcting time base errors is more improved.

What is claimed is:

1. A time base corrector for correcting a time base error of an input analog signal, comprising:

clock generating means for generating a clock signal having a fixed period;

analog-to-digital conversion means responsive to said clock signal for sampling amplide values of said input analog signal at respective sampling points given by said clock signal thereby to obtain a digitized signal;

resampling position signal producing means for detecting said time base error and producing from the detected time base error a resampling position signal indicative of a position of a resampling point relative to corresponding one of said sampling points, said resampling point being a point at which an amplitude value of said input analog signal which would be sampled at the corresponding sampling point is present;

interpolation means for interpolating amplitude values each at the resampling point using said sampled amplitude values from said analog-to-digital conversion means and said resampling position signal, and outputting as a digital signal the interpolated amplitude values at the sampling timings given by said clock signal; and digital-to-analog conversion means responsive to said clock signal for converting the output digital signal from said interpolation means to an analog signal, which is a time base error corrected analog signal.

2. A time base corrector as in claim 1, wherein said interpolation means comprises:

shifting means for sequentially shifting said sampled amplitude values from said analog-to-digital conversion means each by one period of said clock signal thereby to obtain, as parallel output data thereof, a plurality of sequentially shifted sampled amplitude values;

selecting means for selecting, from said parallel output data of said shifting means, a specified number of successive sampled amplitude values at respective successive sampling points within a period in which said resampling point exists according to said resampling position signal;

coefficient producing means for producing predetermined coefficients according to said resampling position signal;

multiplying means for multiplying said sampled amplitude values selected by said selecting means by said predetermined coefficients; and adding means for adding multiplied results from said multiplying means thereby to obtain an interpolated amplitude value.

3. A time base corrector for correcting a time base error of an input analog signal, comprising:

clock generating means for generating a clock signal having a fixed period;

analog-to-digital conversion means responsive to said clock signal for sampling amplitude values of said input analog signal at respective sampling points given by said clock signal thereby to obtain a digitized signal;

resampling position signal producing means for detecting from said digitized signal said time base error and producing from the detected time base error a resampling position signal indicative of a position of a resampling point relative to corresponding one of said sampling points, said resampling point being a point at which an amplitude value of said input analog signal which would be sampled at the corresponding sampling point is present;

interpolation means for interpolating amplitude values each at the resampling point using said sampled amplitude values from said analog-to-digital conversion means and said resampling position signal, and outputting as a digital signal the interpolated amplitude values at the sampling timings given by said clock signal; and digital-to-analog conversion means responsive to said clock signal for converting the output digital signal from said interpolation means to an analog signal, which is a time base error corrected analog signal.

4. A time base corrector as in claim 3, wherein said interpolation means comprises:
- shifting means for sequentially shifting said sampled amplitude values from said analog-to-digital conversion means each by one period of said clock signal thereby to obtain, as parallel output data thereof, a plurality of sequentially shifted sampled amplitude values;
- selecting means for selecting, from said parallel output data of said shifting means, a specified number of successive sampled amplitude values at respective successive sampling points within a period in which said resampling point exists according to said resampling position signal;
- coefficient producing means for producing predetermined coefficients according to said resampling position signal;
- multiplying means for multiplying said sampled amplitude values selected by said selecting means by said predetermined coefficients; and
- adding means for adding multiplied results from said multiplying means thereby to obtain an interpolated amplitude value.

5. A time base corrector for correcting a time base error of an input analog signal, comprising:
- clock generating means for generating a clock signal having a fixed period;
- analog-to-digital conversion means responsive to said clock signal for sampling amplitude values of said input analog signal at respective sampling points given by said clock signal thereby to obtain a digitized signal;
- resampling position signal producing means for detecting said time base error and producing from the detected time base error a resampling position signal indicative of a position of a resampling point relative to corresponding one of said sampling points, said resampling point being a point at which an amplitude value of said input analog signal which would be sampled at the corresponding sampling point is present;
- interpolation means for interpolating amplitude values each at the resampling point using said sampled amplitude values from said analog-to-digital conversion means and said resampling position signal, and outputting as a digital signal the interpolated amplitude values at the sampling timings given by said clock signal; and
- digital-to-analog conversion means responsive to said clock signal for converting the output digital signal from said interpolation means to an analog signal, which is a time base error corrected analog signal,
- wherein said resampling position signal producing means detects said time base error from the output digital signal of said interpolating means.

6. A time base corrector as in claim 5, wherein said interpolation means comprises:
- shifting means for sequentially shifting said sampled amplitude values from said analog-to-digital conversion means each by one period of said clock signal thereby to obtain, as parallel output data thereof, a plurality of sequentially shifted sampled amplitude values;
- selecting means for selecting, from said parallel output data of said shifting means, a specified number of successive sampled amplitude values at respective successive sampling points within a period in which said resampling point exists according to said resampling position signal;
- coefficient producing means for producing predetermined coefficients according to said resampling position signal;
- multiplying means for multiplying said sampled amplitude values selected by said selecting means by said predetermined coefficients; and
- adding means for adding multiplied results from said multiplying means thereby to obtain an interpolated amplitude value.

7. A time base corrector as in claim 5, wherein said resampling position signal producing means includes integrating means for integrating detected time base errors to produce said resampling position signal.

8. A time base corrector as in claim 7, wherein said resampling position signal producing means further includes filter means provided before said integrating means for reducing high frequency noises.

* * * * *